Patented Sept. 27, 1932

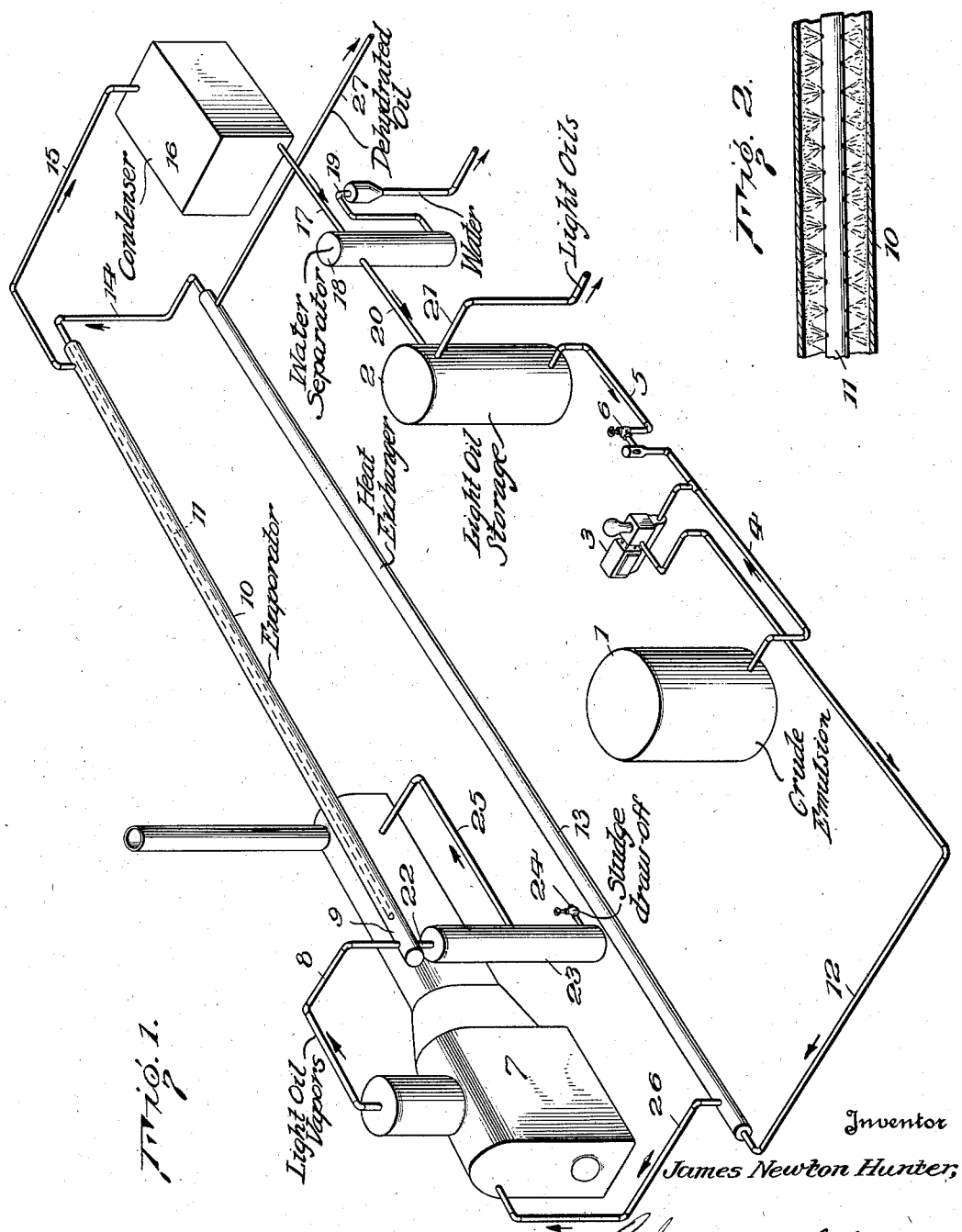

1,879,849

UNITED STATES PATENT OFFICE

JAMES NEWTON HUNTER, OF TULSA, OKLAHOMA, ASSIGNOR TO GULF PIPE LINE COMPANY OF OKLAHOMA, OF TULSA, OKLAHOMA, A CORPORATION OF OKLAHOMA

PROCESS AND APPARATUS FOR DEHYDRATION OF CRUDE OIL EMULSIONS

Application filed March 8, 1930. Serial No. 434,355.

My invention relates to an improved process and apparatus for dehydration, and more particularly to the dehydration of crude oil emulsions by the process of distillation.

The object of my invention is to provide a simple, inexpensive, and efficient method and apparatus for the complete removal of water from any crude oil emulsion regardless of its age, source, or manner of formation.

Further objects, and objects relating to details and economies of operation will definitely appear from the detailed description to follow. In one instance, I accomplish the objects of my invention by the devices and means described in the following specification. My invention is clearly defined and pointed out in the appended claims. One embodiment of my invention is illustrated in the accompanying drawing, forming a part of the specification, in which, Figure 1 is an isometrical perspective view of one form of apparatus for carrying out my process, Fig. 2 is a more detailed view of the evaporator forming a part of the apparatus shown in Fig. 1, the outer casing thereof being cut away to disclose the emulsion spray pipe.

In the drawing, the same reference numerals refer to the same parts throughout the several views.

It has long been recognized that all of the water could be removed from any emulsion by distillation, but there are many problems involved. Distillation processes making use of pipe stills have been used to completely dehydrate such emulsions, but the difficulty involved in controlling the temperature, pressure, and velocity in the tubes, when distilling an emulsion, has resulted in high operating costs, continual replacement of parts, and danger to operators. Distillation processes making use of shell stills have not been fully successful due to the foaming of the charge and the collection of solid matter on the heating surfaces.

When a shell still is filled to the proper level with crude oil emulsion and heat is applied, the mixture will foam before distillation takes place. Liquid will then be carried over with what vapors are evolved and there will be imperfect separation of water from the emulsion. While the boiling point of water is around 212 degrees Fahrenheit, all of the water can not be removed from an undiluted crude oil emulsion by holding it at this temperature. The ordinary emulsion, to be completely dried, must be heated to temperatures between 350 and 450 degrees Fahrenheit, depending upon the quantity of light oil fractions contained in the emulsion. Oil emulsions when heated to these temperatures behave erratically. The particles of water contained therein vaporize with explosive violence, carrying liquid over with the vapors and sometimes injuring the apparatus and its operator.

The water contained in the ordinary crude oil emulsion carries, in solution, salts of sodium, calcium, and magnesium, together with other salts of similar nature. In addition to these salts in solution, finely divided solids are carried mechanically in the emulsion. When an emulsion is distilled by the application of heat to the containing pipe or still wall, the salts in solution, together with the finely divided solids, are deposited upon the heated surfaces in large quantities. These deposits are extremely hard. They adhere to the heated surfaces tenaciously and are practically insoluble in water, oil, or the ordinary acids. Mechanical means must be employed for this removal. If allowed to accumulate for any appreciable length of time, the heat transfer is decreased and the parts are eventually burned out.

In general, my invention consists in the dilution of the raw emulsion with a light oil distillate, or its equivalent, thereby reducing the vapor pressure and surface tension of the mixture and thus facilitating foam-free and bump-free evaporation of the water and light oil fractions upon the application of distillation heat.

My invention further consists in the distillation of crude oil emulsion, with or without previous dilution, by intimately mixing said emulsion with hot oil vapor, thus subjecting the emulsion to temperatures at which all the water and the most volatile fractions of the oil will vaporize and can be Referring to the numbered parts of my drawing, I employ, in my preferred apparatus, a raw emulsion storage tank 1, and a diluent storage tank 2. The raw emulsion and diluent are conveyed to a conventional steam pump 3 through pipes 4 and 5, respectively. A sight feed regulating valve 6 is provided in the diluent line 5 for controlling the amount of diluent being mixed with the raw emulsion. I provide a still 7, shown as of the locomotive boiler type, which is charged with dry oil and evolves hot dry oil vapors which are conveyed through pipe 8 to emulsion evaporator 9. As is best shown in Fig. 2, the evaporator proper consists of an outer casing 10 in which the hot dry vapors are contained and a spray pipe 11 through which the diluted emulsion is injected into intimate contact with the hot oil vapors. The evaporator is slightly elevated at its end most remote from pipe 8, for reasons later to become apparent. Referring again to Fig. 1, the diluted emulsion is pumped by pump 3 through pipe 12, heat exchanger 13 and pipe 14 into the spray pipe 11 of the evaporator. When sprayed from pipe 11 and coming in contact with the hot dry oil vapors in the evaporator casing 10, the water and light fractions of the diluted emulsion are vaporized and carried off with the uncondensed vapors from the still through pipe 15 to a conventional condenser 16, where they are condensed. The condensate is then led through pipe 17 into the water separator 18, which may be of the conventional gravity type. The water, being heavier, settles to the bottom of the separator and is carried off through siphon pipe 19. The light oil from the separator will be found to be completely free of suspended water and is piped through pipe 20 to the diluent storage tank 2. The surplus light oil may be conveyed through pipe 21 to permanent storage (not shown). The less volatile fractions of the hot oil vapors from the still, upon giving up heat to the sprayed emulsion, condense in the evaporator and, along with the heavy but completely dehydrated oil from the emulsion, collect in the lower end of the evaporator casing and flow through pipe 22 into settling tank 23 which removes the heavier solids. These may be drawn off through valve 24 when desired. The oil is thence led into the still through pipe 25. As more oil is supplied to the still than is evolved therefrom as hot oil vapors, due to the constant addition of emulsion, it is necessary to provide an overflow pipe 26 from the still. The hot oil thus conveyed passed through pipe 27 to permanent storage (not shown).

In the following description, the results of commercial treatment of Kansas crude oil emulsion will be given. The percentages and temperatures are stated for illustration only. In practice, these figures will vary widely depending upon various operating conditions, the character of the emulsion being treated, and the resulting products desired.

In operation, the still 7 is filled to the proper level with a dry crude oil or other suitable oil containing about 25% of material boiling below 350 degrees Fahrenheit. Heat is applied to the still until the temperature of the vapors leaving the still is approximately 350 degrees Fahrenheit. By the time this temperature is reached, considerable distillate will have collected in the distillate storage tank 2. Pump 3 is then started drawing emulsion through pipe 4 from tank 1. Valve 6 is then adjusted to admit to pump 3 through pipe 5 a quantity of light oil distillate equal to about 10% of the total fluid being charged. The mixture consisting of about 90% raw emulsion and 10% light oil distillate being discharged by pump 3, passes through pipe 12 to heat exchanger 13. In passing through heat exchanger 13, the mixture is heated. The mixture then passes through pipe 14 into spray pipe 11, where, in a finely divided state, it is brought into intimate contact with the hot oil vapors in the evaporator casing 10. The exchange of heat between the incoming mixture and the hot vapors brings about the evaporation of the water and some light distillate from the incoming mixture and a partial condensation of the hot vapors from the still. The vapors of the water and the light distillate driven from the incoming mixture pass from the evaporator through pipe 15 into condenser 16 where condensation takes place. The condensate consisting of water and light oil passes through pipe 17 to water separator 18. The water settles to the bottom and overflows through siphon 19, while the light oil passes through pipe 20 to light oil storage tank 2. More light oil is continually produced than is required for dilution of the raw emulsion, and for this reason tank 2 is always full. The surplus light oil being produced overflows from tank 2 through pipe 21 and may be recovered separately or may be mixed back with the heavy dry oil leaving the plant through pipe 27. The heavy dry oil which represents the residue of the incoming mixture after having its water and light oil removed, flows downwardly through the evaporator 9 toward the still, due to the elevation of its far end.

Mixed with this dry oil is such oil as was condensed from the hot vapors by the incoming charge. This mixture of dry residue oil and condensate pass through pipe 22 into trap 23. Any unusually heavy solids settle in trap 23 and may be withdrawn from time to time through valve 24. The dry oil which contains some suspended solid matter passes through pipe 25 into still 7. In still 7, hot vapors having a temperature of approximately 350 degrees Fahrenheit are evolved and return to the evaporator to repeat the cycle while the residue from the still passes through pipe 22 to the heat exchanger 13 where it gives up a part of its heat to the incoming diluted emulsion so that the dry residue oil is cooled to a temperature where there is no loss by evaporation. From the heat exchanger, the cooled dry oil passes to storage through pipe 27.

It is to be understood that temperature indicating, recording, and controlling devices, together with nonessential valves and fittings have been omitted from the drawing for the sake of more clearly showing the essential features.

On account of the wide variation in the quality of emulsions to be treated, it is impossible to give definite figures regarding temperatures in various parts of the apparatus. Neither is it possible to give definite percentages of light oil distillate to be mixed with the raw emulsion. These are entirely dependent upon the characteristics of the oil in the emulsion and the percentage of water it contains. As a general rule, the amount of light oil distillate to be mixed with the emulsion is proportional to the amount of water contained therein. The temperature of the liquid in the still may be varied from 300 to 600 degrees Fahrenheit, depending upon the type of emulsion to be handled, the amount and boiling point of the light oil added, and the rate at which dry oil is produced.

In running with the correct amount of light oil distillate mixed with the emulsion, and a still temperature above 400 degrees Fahrenheit, evaporation of all water is effected with little or no foaming in the evaporation. No solid matter is deposited on the surfaces of the evaporator. Some small amount of solid matter settles in the sediment trap, but not enough to require cleaning more than once in several months. Owing to the violent agitation in the still from boiling, very little solid matter settles there. When use is made of the type of still shown, such solid matter as does settle finds its way to the cooler portion of the still and does not cause burning or warping of the still plates. Such solid matter as does settle does not collect in the form of scale or a hard solid mass, but rather as a sludge which can be readily flushed out every few months. The dry oil discharge from the plant may contain as much as 1% of finely divided solid matter in mechanical suspension. Much of this settles out as soon as the oil comes to rest in the first storage tank. If the dry oil is mixed with other oils for transportation or storage, the solid matter soon settles in the tanks through which it is handled or stored.

Numerous advantages become evident in the practical application of my invention. The apparatus requires no expensive foundations of brick or concrete, and no especially fabricated parts, but consists only of such materials as are found standard in any oil field. Since the plant is built entirely of stock equipment, screwed and flanged together, it may be easily and cheaply taken down for removal to another location or the parts may be returned to the conventional use for which they were intended.

Since the process operates at atmospheric pressure except for the oil being charged to the evaporator, the difficulties encountered in high pressure processes are eliminated. Except for spraying the emulsion mixture into the evaporator, all of the liquids pass through the plant by gravity flow, thus ensuring uniform flow and constant movement without the use of auxiliary pumps and equipment.

When desired, fuel for the plant may be taken directly from the bottom of the still, and will give no trouble in the burners due to the finely divided character of the suspended solid matter. A portion of the feed water for operating the charging pump is produced within the plant in the form of distilled water overflowing from the water separator.

The process is simple and except for the control of charging rates and temperature, is entirely automatic. These are readily controllable by present day instruments. Considerable fluctuation in temperature or charging rate will not unbalance the system or cause water to pass through with the dry oil. There is no tendency for the water and oil distillate to emulsify, and, therefore, the water settles from the distillate almost immediately upon condensation, leaving it practically dry.

Under the most adverse operating conditions, the still shows no tendency to cake up or form scale. Slight corrosion occurring in the condensers can be completely eliminated by the use of cast iron condenser sections. There is no apparent corrosion in the still, evaporator, or other parts of the apparatus.

I am aware that the method and apparatus herein disclosed may be changed considerably without departing from the spirit of my invention. I, therefore, claim my invention broadly as indicated by the appended claims.

What I claim is:

1. The process of dehydrating crude oil emulsions which consists of mixing the degrees Fahrenheit, bringing the mixture into intimate contact with oil vapors having a temperature above 300 degrees Fahrenheit and condensing the evolved water and oil vapors.

2. The process of dehydrating crude oil emulsions which consists of mixing the emulsion with approximately 10% by volume of light oil distillate boiling below 350 degrees Fahrenheit, spraying the mixture into a body of oil vapor having a temperature above 300 degrees Fahrenheit, condensing the evolved water and oil vapors, and separating the condensate into water and oil.

3. Dehydrating apparatus comprising the combination of a still, an evaporator connected to said still and receiving hot vapors therefrom, said evaporator being inclined so as to drain back toward the still, a spray pipe within said evaporator, means for discharging an oil emulsion through said spray pipe, and means for carrying off the vapors evolved in said evaporator.

4. Dehydrating apparatus comprising the combination of a still, an evaporator connected to said still and receiving hot vapors therefrom, said evaporator being inclined so as to drain back toward the still, a spray pipe within said evaporator, means for discharging an oil emulsion through said spray pipe, means for carrying off the vapors evolved in said evaporator, and a settling tank connected to the lower end of said evaporator to receive liquid draining back therein.

5. Dehydrating apparatus comprising the combination of a still, an evaporator connected to said still and receiving hot vapors therefrom, a spray pipe within said evaporator, a force pump, a pipe connecting the outlet of said pump with said spray pipe, an emulsion tank, a diluent tank, and means connecting said tanks with the inlet of said pump.

6. Dehydrating apparatus comprising the combination of a still, an evaporator connected to said still and receiving hot vapors therefrom, a spray pipe within said evaporator, a force pump, a pipe connecting the outlet of said pump with said spray pipe, an emulsion tank, a diluent tank, means connecting said tanks with the inlet of said pump, a condenser, a conduit connecting said evaporator and condenser through which vapors evolved in said evaporator are carried to the condenser, an oil and water separator connected to said condenser and a pipe connecting said separator and said diluent tank through which oil is discharged from the separator.

JAMES NEWTON HUNTER.